US012668315B2

(12) United States Patent
Thomas et al.

(10) Patent No.: US 12,668,315 B2
(45) Date of Patent: Jun. 30, 2026

(54) PULTRUDED AND CONTINUOUS FLOORING

(71) Applicant: ZEPHYROS, INC., Romeo, MI (US)

(72) Inventors: Joseph Thomas, Romeo, MI (US); Manish Taxak, Maharashtra (IN)

(73) Assignee: Zephyros, Inc., Romeo, MI (US)

( * ) Notice: Subject to any disclaimer, the term of this patent is extended or adjusted under 35 U.S.C. 154(b) by 119 days.

(21) Appl. No.: 17/639,719

(22) PCT Filed: Oct. 19, 2020

(86) PCT No.: PCT/US2020/056312
§ 371 (c)(1),
(2) Date: Mar. 2, 2022

(87) PCT Pub. No.: WO2021/080917
PCT Pub. Date: Apr. 29, 2021

(65) Prior Publication Data
US 2022/0289306 A1 Sep. 15, 2022

Related U.S. Application Data

(60) Provisional application No. 62/965,438, filed on Jan. 24, 2020, provisional application No. 62/925,480, filed on Oct. 24, 2019.

(51) Int. Cl.
*B62D 25/20* (2006.01)
*B62D 29/00* (2006.01)
*B62D 29/04* (2006.01)

(52) U.S. Cl.
CPC ....... *B62D 25/2054* (2013.01); *B62D 29/002* (2013.01); *B62D 29/04* (2013.01)

(58) Field of Classification Search
CPC .. B62D 25/2054; B62D 29/04; B62D 29/041; B62D 29/002; B62D 53/061; B62D 53/06; B62D 63/06; B62D 33/02; E04B 5/10
USPC ....................................................... 296/184.1
See application file for complete search history.

(56) References Cited

U.S. PATENT DOCUMENTS

| | | | |
|---|---|---|---|
| 3,317,471 A | 5/1967 | Johnson et al. | |
| 4,017,986 A | 4/1977 | Miller | |
| 4,438,254 A | 3/1984 | Doorakian et al. | |
| 4,647,648 A | 3/1987 | Silvis et al. | |

(Continued)

FOREIGN PATENT DOCUMENTS

| | | |
|---|---|---|
| CN | 1433443 A | 7/2003 |
| CN | 101913255 A | 12/2010 |

(Continued)

OTHER PUBLICATIONS

Potentially related copending U.S. Appl. No. 16/498,368, filed Oct. 10, 2019 (Published as US2020/0114979).

(Continued)

*Primary Examiner* — Gregory A Blankenship
(74) *Attorney, Agent, or Firm* — The Dobrusin Law Firm, P.C.; Katherine P. Pacynski

(57) ABSTRACT

A flooring system comprising: one or more structural members, each of the one or more structural members having opposing outer portions interconnected by ribs, the opposing outer portions and the ribs forming a plurality of channels within the one or more structural members along a length of each structural member.

20 Claims, 5 Drawing Sheets

(56) References Cited

U.S. PATENT DOCUMENTS

| | | | | |
|---|---|---|---|---|
| 4,703,948 | A | 11/1987 | Ehrlich | |
| 4,758,128 | A * | 7/1988 | Law | B60P 3/122 |
| | | | | 52/588.1 |
| 4,838,605 | A * | 6/1989 | Abromavage | B62D 25/2054 |
| | | | | 105/422 |
| 4,978,562 | A | 12/1990 | Wycech | |
| 5,115,075 | A | 5/1992 | Brennan et al. | |
| 5,164,472 | A | 11/1992 | White et al. | |
| 5,275,853 | A | 1/1994 | Silvis et al. | |
| 5,401,814 | A | 3/1995 | Schomaker et al. | |
| 5,403,063 | A | 4/1995 | Sjostedt et al. | |
| 5,464,924 | A | 11/1995 | Silvis et al. | |
| 5,509,715 | A * | 4/1996 | Scharpf | B62D 25/2054 |
| | | | | 105/422 |
| 5,730,485 | A * | 3/1998 | Sjostedt | B62D 25/2054 |
| | | | | 296/181.3 |
| 5,741,042 | A | 4/1998 | Livingston et al. | |
| 5,791,714 | A * | 8/1998 | Hall, Jr. | B62D 25/2054 |
| | | | | 296/184.1 |
| 5,888,612 | A * | 3/1999 | Needham | C03C 25/20 |
| | | | | 428/116 |
| 6,011,111 | A | 1/2000 | Brennan et al. | |
| 6,174,023 | B1 * | 1/2001 | Booher | B62D 25/2054 |
| | | | | 296/184.1 |
| 6,595,142 | B2 * | 7/2003 | Christensen | B61D 17/10 |
| | | | | 248/429 |
| 6,668,457 | B1 | 12/2003 | Czaplicki | |
| 6,699,554 | B2 | 3/2004 | Sager et al. | |
| 6,730,713 | B2 | 5/2004 | Czaplicki | |
| 6,736,442 | B2 | 5/2004 | Gebreselassie | |
| 6,855,652 | B2 | 2/2005 | Hable et al. | |
| 7,125,461 | B2 | 10/2006 | Czaplicki et al. | |
| 7,199,165 | B2 | 4/2007 | Kassa et al. | |
| 7,318,873 | B2 | 1/2008 | Czaplicki et al. | |
| 7,438,782 | B2 | 10/2008 | Sheasley et al. | |
| 7,473,715 | B2 | 1/2009 | Czaplicki et al. | |
| 7,581,932 | B2 | 9/2009 | Coupe et al. | |
| 7,784,186 | B2 | 8/2010 | White et al. | |
| 7,892,396 | B2 | 2/2011 | Sheasley | |
| 8,236,128 | B2 | 8/2012 | Kassa et al. | |
| 8,430,448 | B2 | 4/2013 | Richardson et al. | |
| 8,696,048 | B2 | 4/2014 | Griffin et al. | |
| 8,771,564 | B2 | 7/2014 | Kassa et al. | |
| 9,427,902 | B2 | 8/2016 | Werner | |
| 10,272,950 | B1 * | 4/2019 | Smith, Jr. | B62D 33/02 |
| 10,570,258 | B2 | 2/2020 | Richardson et al. | |
| 10,717,472 | B2 | 7/2020 | Wiberg | |
| 10,829,163 | B2 | 11/2020 | McCloud | |
| 11,110,670 | B2 | 9/2021 | Richardson et al. | |
| 2002/0024233 | A1 | 2/2002 | Kleino | |
| 2003/0039792 | A1 | 2/2003 | Hable et al. | |
| 2006/0071506 | A1 * | 4/2006 | Adams | B62D 21/20 |
| | | | | 296/184.1 |
| 2006/0179733 | A1 * | 8/2006 | Padmanabhan | E04F 15/048 |
| | | | | 52/177 |
| 2007/0216197 | A1 * | 9/2007 | Wuerfel | B62D 25/2054 |
| | | | | 296/184.1 |
| 2007/0270515 | A1 | 11/2007 | Chmielewski et al. | |
| 2008/0174147 | A1 * | 7/2008 | Skaradzinski | B62D 33/048 |
| | | | | 296/181.3 |
| 2008/0211218 | A1 * | 9/2008 | Booher | B62D 27/023 |
| | | | | 280/789 |
| 2009/0202294 | A1 | 8/2009 | Apfel | |
| 2009/0243335 | A1 * | 10/2009 | Messier | B62D 53/061 |
| | | | | 296/184.1 |
| 2009/0298974 | A1 | 12/2009 | Chmielewski et al. | |
| 2010/0289242 | A1 | 11/2010 | Nitsche et al. | |
| 2010/0314813 | A1 | 12/2010 | Wojtowicki | |
| 2011/0039470 | A1 | 2/2011 | Wakeman et al. | |
| 2011/0278802 | A1 | 11/2011 | Nitsche et al. | |
| 2012/0169087 | A1 * | 7/2012 | Griffin | B62D 29/043 |
| | | | | 296/184.1 |
| 2012/0251863 | A1 | 10/2012 | Berger et al. | |
| 2013/0020019 | A1 | 1/2013 | Nogues et al. | |
| 2013/0252529 | A1 | 9/2013 | Baldsiefen | |
| 2013/0313857 | A1 | 11/2013 | Lu | |
| 2015/0129116 | A1 | 5/2015 | Richeton et al. | |
| 2015/0165737 | A1 | 6/2015 | Richardson et al. | |
| 2016/0046047 | A1 | 2/2016 | Gleyal et al. | |
| 2016/0273160 | A1 | 9/2016 | Braymand et al. | |
| 2016/0325797 | A1 * | 11/2016 | Booher | B62D 21/20 |
| 2017/0028998 | A1 | 2/2017 | Davis et al. | |
| 2017/0050365 | A1 | 2/2017 | Richardson | |
| 2017/0247821 | A1 | 8/2017 | Siboni et al. | |
| 2018/0036970 | A1 | 2/2018 | Chmielewski et al. | |
| 2018/0037703 | A1 | 2/2018 | Richardson et al. | |
| 2018/0327180 | A1 * | 11/2018 | He | B65D 90/12 |
| 2019/0047634 | A1 * | 2/2019 | McCloud | B32B 5/022 |
| 2020/0114979 | A1 * | 4/2020 | Thomas | B62D 27/06 |
| 2020/0155386 | A1 * | 5/2020 | Kumar | B62D 25/2054 |
| 2020/0157293 | A1 | 5/2020 | Chmielewski et al. | |
| 2021/0053625 | A1 | 2/2021 | Richardson | |
| 2021/0129917 | A1 * | 5/2021 | Sagarsee | B62D 25/2054 |
| 2021/0129918 | A1 * | 5/2021 | Adams | B62D 25/2054 |
| 2021/0237377 | A1 | 8/2021 | Richardson | |
| 2022/0080912 | A1 | 3/2022 | Barz | |
| 2022/0097776 | A1 | 3/2022 | Royston | |
| 2022/0144159 | A1 * | 5/2022 | Smith | B62D 25/2054 |
| 2022/0227428 | A1 * | 7/2022 | Muta | B62D 25/2036 |
| 2022/0289306 | A1 * | 9/2022 | Thomas | B62D 25/2054 |
| 2022/0324521 | A1 * | 10/2022 | Kumar | B62D 25/2054 |
| 2022/0379975 | A1 * | 12/2022 | Bykovskyi | B62D 21/17 |

FOREIGN PATENT DOCUMENTS

| | | | |
|---|---|---|---|
| CN | 102766343 | A | 11/2012 |
| EP | 0958994 | A2 | 11/1999 |
| EP | 1104827 | A2 | 6/2001 |
| EP | 3236130 | A1 | 10/2017 |
| GB | 2382598 | A | 6/2003 |
| JP | H09287276 | A | 11/1997 |
| WO | 98/14498 | A1 | 4/1998 |
| WO | 2007/008569 | A1 | 1/2007 |
| WO | 2007/117663 | A2 | 10/2007 |
| WO | 2008/010823 | A2 | 1/2008 |
| WO | 2009/127638 | A1 | 10/2009 |
| WO | 2010/054194 | A1 | 5/2010 |
| WO | 2011/111510 | A1 | 9/2011 |
| WO | 2013/132944 | A1 | 9/2013 |
| WO | 2015/061291 | A1 | 4/2015 |
| WO | 2015/095325 | A1 | 6/2015 |
| WO | 2020/198139 | A1 | 10/2020 |
| WO | 2020/205192 | A1 | 10/2020 |
| WO | 2020/214769 | A1 | 10/2020 |

OTHER PUBLICATIONS

International Search Report and Written Opinion, Application No. PCT/US2020/056312, mailed Jan. 27, 2021.

Supplementary Search Report, dated Jul. 5, 2024, for Chinese Application No. 202080068536.0.

Chinese Third Office Action, dated Oct. 16, 2024, for Chinese Application No. 202080068536.0.

Hellow, "2.1. 3 Weld groove preparation", "Pressure vessel soldering process and soldering defect handling case", 1st edition, Apr. 2018, pp. 50-51.

* cited by examiner

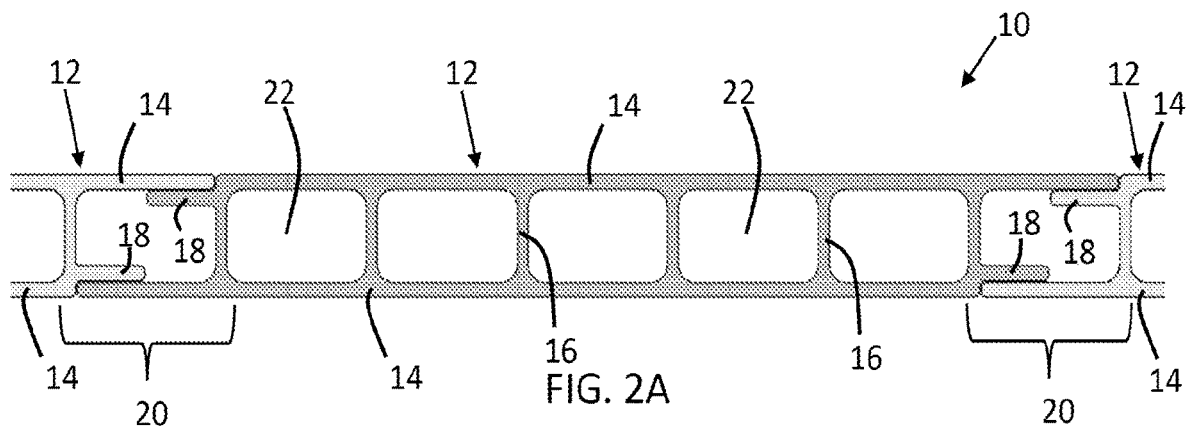
FIG. 2A
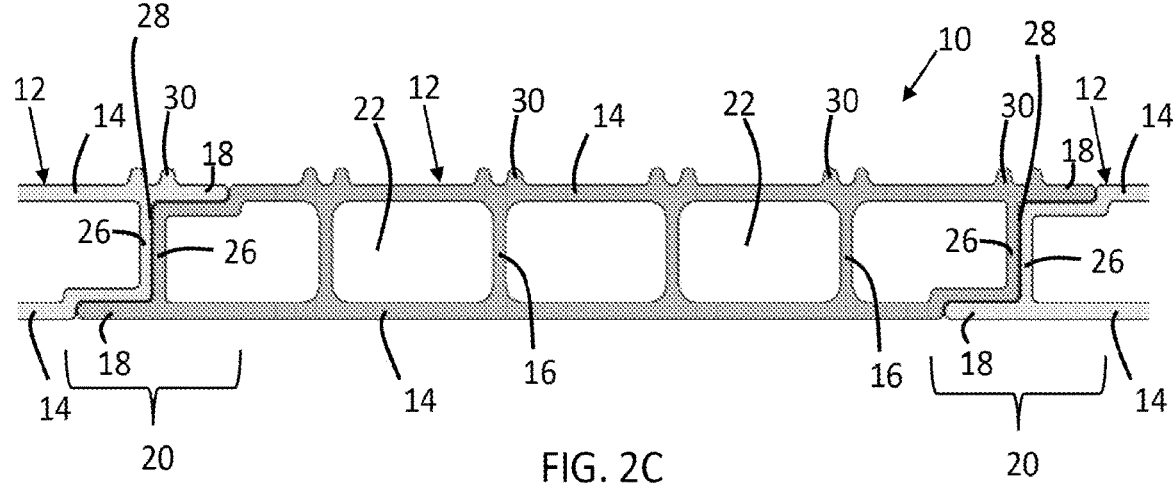
FIG. 2B
FIG. 2C

PULTRUDED AND CONTINUOUS FLOORING

FIELD

The present teachings generally relate to a flooring system, and more specifically, to a flooring system having one or more pultruded structural members or continuous structural members.

BACKGROUND OF THE INVENTION

There is an ongoing effort in many industries to lighten the weight of articles. In many instances, this is achieved by the selection of materials that have a lower density, thinner section thicknesses, or both, as compared with prior materials or structures. As a result, there is a potential for the weakening of structures, and the consequent need for stiffening or other structural reinforcement.

One particular ongoing effort may be found in the transportation industry. The transportation industry continuously makes attempts to improve commercial vehicles through light-weighting efforts and cost-savings plans. As a result, commercial vehicles, such as transportation trucks, are frequently modified to include lighter and cheaper materials. For example, commercial vehicles may implement a light-weight aluminum-based modular flooring to provide a uniform flooring across multiple vehicle platforms while also providing a simplified assembly process.

However, often times it is difficult for the lighter and cheaper materials used to meet industry requirements. For example, transportation vehicles may require flooring in the cargo container that meets specific load requirements or cross-sectional shapes to ensure cargo being transported is sufficiently supported. Furthermore, the flooring may require minimum insulation characteristics if the shipping container is insulated and configured to carry perishable items, such as food and/or biomedical items. Additionally, transportation vehicles may be required to support a weight of one or more fork trucks (i.e., a fork-lift) for loading and unloading the vehicles. As a result of the demanding requirements identified above, often times light-weighting efforts and cost-savings plans fail due to extensive design and validation time needed before an alternative solution may be implemented. Furthermore, because the alternative materials frequently used require unique reinforcement to meet the above-mentioned standards, the cost often saved on the base material is often exceeded by the addition of one or more structural reinforcements.

Thus, it would be attractive to have an alternative flooring structure that meets one or more of the requirements identified above. What is needed is a flooring structure that meets the necessary load bearing requirements in commercial transportation. It would be attractive to have a flooring structure that is tunable and easily customizable to meet varying industry demands. What is needed it a flooring structure configured to include one or more reinforcement modifiers without drastically increasing the overall flooring cost, weight, or both. It would be attractive to have a flooring structure that easily replaces structures currently used in the transportation industry. What is needed is a modular flooring structure that meets the current industry demands and is easily interchangeable. It would be attractive to have a flooring structure that is customizable based on a specific type of transportation. What is needed is a composite flooring system having one or more cavities configured to receive a structural reinforcing material, insulation material, or both to meet specific transportation requirements based on the goods being transported.

SUMMARY

The present teachings meet one or more of the present needs by providing: a flooring system comprising: one or more structural members, each of the one or more structural members having opposing outer portions interconnected by ribs, the opposing outer portions and the ribs forming a plurality of channels within the one or more structural members along a length of each structural member.

The present teachings meet one or more of the present needs by providing: a method of forming the flooring system of any of the preceding claims, comprising: (a) pultruding a glass-filled polyurethane material to form the one or more structural members, the one or more structural members being a plurality of structural members; (b) interconnecting the plurality of structural members; and (c) laminating the plurality of interconnected structural members to a substrate.

The present teachings meet one or more of the present needs by providing a flooring system, wherein: the one or more structural members is a plurality of structural members interconnected to form the flooring system; each structural member includes one or more projections and the one or more projections of abutting structural members form a joint to connect the abutting structural members; the flooring system further comprises a substrate and the structural member is disposed along a surface of the substrate; each structural member is an integrally formed pultruded material; the integrally formed pultruded material is a polyurethane material; the integrally formed pultruded material includes a base material and one or more reinforcing additives; the plurality of channels are coplanar, parallel, or both; at least a portion of the plurality of channels is filled with an insert; the insert is a structural foam reinforcing material, sealant material, or both; the plurality of channels have a uniform height and a uniform width; the flooring system is corrosion resistant, moisture resistant, antimicrobial, anti-fungal, antibacterial, or a combination thereof; the flooring system is a transportation trailer floor; the flooring system is thermally insulated; at least one of the outer portions includes a plurality of nubs disposed along an outer surface; the plurality of structural members abut one another to form a notch, and the notch is filled with an adhesive, sealant, or both to interconnect the plurality of structural members; at least one of the outer portions includes a contoured ramp; the opposing outer portions of the plurality of structural members are coplanar; each channel is fully enclosed except for terminal ends of each channel along a longitudinal axis of each channel; the plurality of structural members each include outer walls, and the outer walls of each structural member abut the outer walls of at least one other structural, and a sealant, adhesive, of both is disposed between the abutting outer walls to form a joint; or a combination thereof.

The present teachings meet one or more of the present needs by providing: an alternative flooring structure that meets one or more of the requirements identified above; a flooring structure that meets the necessary load bearing requirements in commercial transportation; a flooring structure that is tunable and easily customizable to meet varying industry demands; a flooring structure configured to include one or more reinforcement modifiers without drastically increasing the overall flooring cost, weight, or both; a flooring structure that easily replaces structures currently used in the transportation industry; a modular flooring structure that meets the current industry demands and is easily interchangeable; a flooring structure that is customizable based on a specific type of transportation; a composite flooring system having one or more cavities configured to receive a structural reinforcing material, insulation material, or both to meet specific transportation requirements based on the goods being transported; or a combination thereof.

BRIEF DESCRIPTION OF THE DRAWINGS

FIG. 2A is an illustrative cross-sectional view 2-2 of FIG. 1.

FIG. 2B is an illustrative cross-sectional view 2-2 of FIG. 1.

FIG. 2C is an illustrative cross-sectional view 2-2 of FIG. 1.

DETAILED DESCRIPTION

Figure 1:
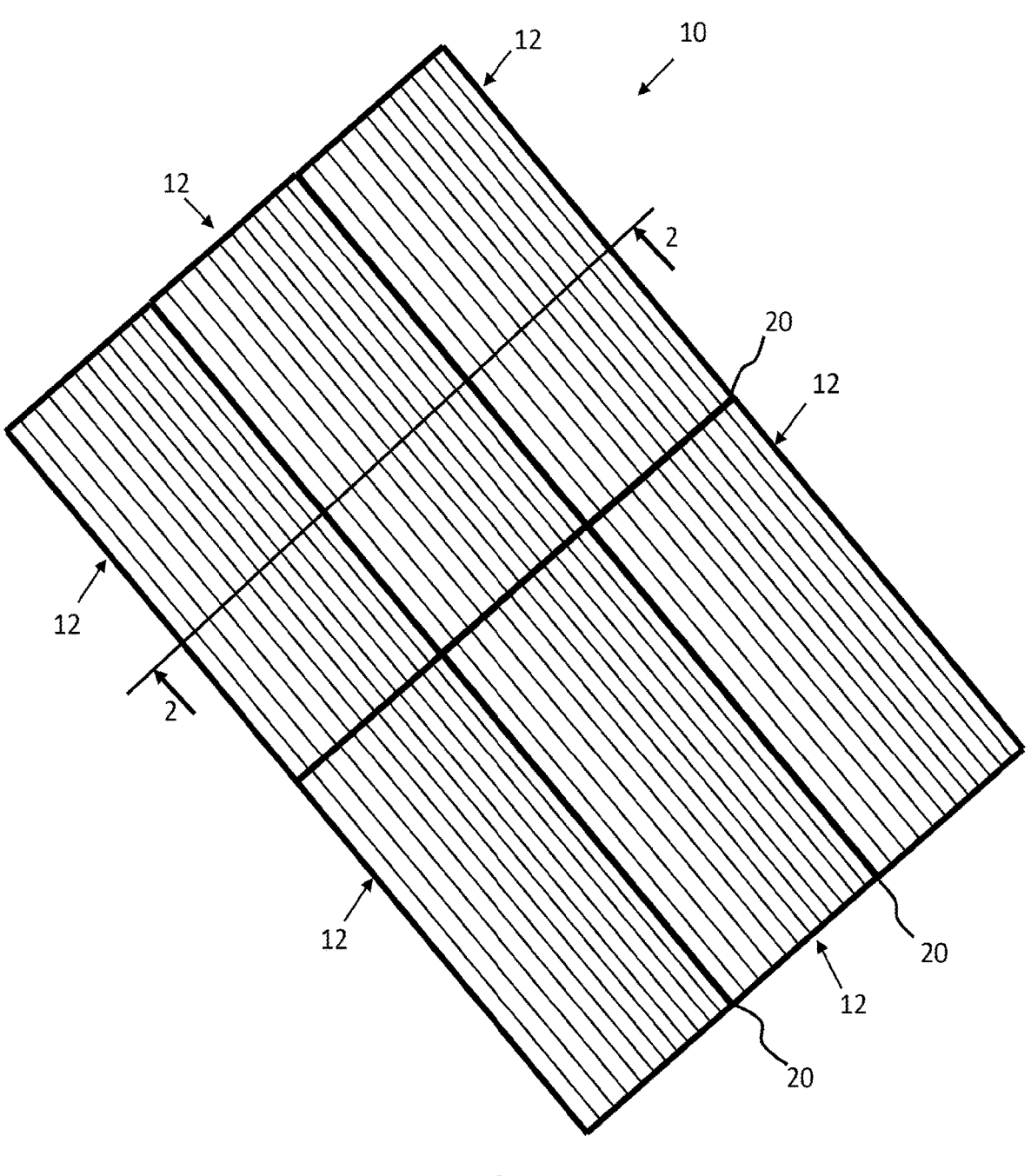
FIG. 1 is a top perspective view of a flooring system.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The teachings herein relate to a flooring system. The flooring system may function to provide structural support. The flooring system may function to reinforce an existing floor. The flooring system may insulate one or more compartments, rooms, or both. The flooring system may be configured for one or more industries, such as transportation vehicles, residential construction, commercial construction, aerospace, marine, structural containers, or a combination thereof. For example, the flooring system may be configured to form a floor on a refrigerated transportation vehicle to provide structural support to a subfloor, at least partially insulate the transportation vehicle, or both. The flooring system may be configured to meet one or more structural requirements of a given industry. For example, the flooring system may be configured to meet a desired stiffness, withstand a minimum compression force, prevent a minimum transverse flexion, prevent buckling of one or more portions of the flooring system (e.g., one or more channels), or a combination thereof. For example, the flooring system may be located within a trailer of a transportation vehicle and may be required to withstand a weight of transported goods, one or more vehicle operators, a fork-lift loading and unloading the trailer, or a combination thereof.

The flooring system may include one or more layers, one or more interconnected components, or a combination thereof. For example, the flooring system may include a first structural layer disposed on a second supporting layer to form the flooring system. The flooring system may include one or more additives to increase mechanical integrity, improve material characteristics, of both. The flooring system may vary in size and/or shape. The flooring system may be any size and/or shape based on a given application. The flooring system may be customizable to fit within boundaries of any given space. For example, the flooring system may have dimensions substantially similar or equal to dimensions of an inner perimeter of a transportation trailer. The flooring system may be disposed on top of an existing floor or may replace the existing floor. The flooring system may be easily replaceable, repairable, or both. For example, the flooring system may include a plurality of interconnected portions, and each interconnected portion may be removable individually for replacement, repair, or both.

The flooring system may be tunable to meet any desired industry standards. The industry standards may require one or more mechanical requirements of the flooring system, material requirements of the flooring system, or both. The one or more requirements may include: a maximum load capacity, a thermal insulation value, a desired stiffness, a desired toughness, a maximum weight, specific dimensions, a compression factor, or a combination thereof. For example, the flooring system may have a load capacity of about 10 kiloNewtons (kN) or more, about 20 kN or more, or about 30 kN or more. The flooring system may have a load capacity of about 60 kN or less, about 50 kN or less, or about 40 kN or less. The flooring system may have a thermal resistance value (i.e., R-value measured in $F \cdot ft^2 \cdot h/Btu$) of about 5 or more, about 10 or more, or about 15 or more. The flooring system may have an R-value of about 30 or less, about 25 or less, or about 20 or less. It is contemplated that the flooring system may be configured to have material characteristics similar to a conventional flooring system. For example, a conventional floor may be made from aluminum and the flooring system may have similar or substantially equal structural characteristics to an aluminum floor.

The flooring system may include one or more structural members. The structural members may function to provide structural integrity to the flooring system. The structural members may function to provide a supportive layer to the flooring system configured to contact one or more objects, one or more people, or both. The structural members may be rigid. The structural members may flexible, compressible, or both. The structural members may be monolithically (i.e., integrally) formed or may include a plurality of components joined together. The structural members may have any desired size and/or shape based on a given application. The structural members may include one or more surfaces, one or more reinforcing structures, or both. The flooring system may include any number of structural members for an application. For example, the flooring system may include about one or more, about ten or more, or about 20 or more structural members. The flooring system may include about 30 or less, about 25 or less, or about 20 or less structural members. The structural members within a flooring system may be substantially uniform. Alternatively, the structural members may vary in structure, dimensions, properties, or a combination thereof. For example, structural members configured to form a perimeter of the flooring system may have one or more brackets to join the flooring system to walls of a compartment while interior structural members may be free of the one or more brackets.

The structural members may have any desired thickness. The structural members may have a thickness of about 10 mm or more, about 20 mm or more, or about 30 mm or more. The structural members may have a thickness of about 60 mm or less, about 50 mm or less, or about 40 mm or less. The structural members may maintain a substantially uniform thickness or may have segmented portions having varying thicknesses. For example, the structural members may have a first segment having a thickness of about 20 mm and a second segment having a thickness of about 10 mm. A thickness of the structural members may be configured to meet one or more mechanical characteristics. For example, the thickness of the structural member may directly correlate to a load capacity of the structural member. As such, an increase in thickness of the structural members may result in an increased load capacity, or vice versa.

The structural members may interconnect with each other to form the flooring system. The structural members may be configured to create a substantially uniform floor. For example, the structural members may have one or more substantially coplanar surfaces to create a substantially flat surface. The structural members may include any additional features needed based on a given application. The additional features may include one or more holes, one or more grooves, one or more abrasive surfaces, one or more friction modifiers (e.g., grease, oil, another lubricant, etc.), one or more mechanical fasteners, one or more spacers, one or more brackets, one or more ducts, or a combination thereof.

The structural members may be formed using one or more manufacturing methods. The structural members may be injection-molded, cast, stamped, or a combination thereof. The structural members may be extruded. It is contemplated that the structural member may be pultruded. The pultrusion process may be a continuous molding process where one or more fibers saturated with one or more polymers are extended through (i.e., pulled through) a heated die to form a final pultruded part. The pultrusion process may include one or more operations to form one or more features of the structural members. For example, the pultrusion process may include an embossment process that forms a desired pattern or feature on the structural members. The embossment process may be performed simultaneously with the forming of the structural members (e.g., when the material is pulled through a die to form a shape of the structural members). Alternatively, or additionally, the embossment process may be a secondary process within the overall pultrusion process. For example, the pultruded structural member may be embossed shortly after being pulled through a die that forms a shaft of the structural member but before the structural member fully cools so that the structural member is still moldable. Thus, it is contemplated that the embossment process may be conducted after pultrusion of the structural members but before a cooling stage of the pultrusion process. The pultrusion may be performed according to the teachings of PCT Application No. PCT/US2018/031022, filed on May 4, 2018; and US Patent Publication No. 2018/0036970, filed on Mar. 10, 2016; all of which is incorporated herein for all purposes. The pultruded structural members may be formed from any materials based on desired material properties. For example, the structural members may be formed from one or more fiber bundles pre-impregnated with one or more polymers, impregnated with one or more polymers during the pultrusion process, or both. The structural members may include one or more fiber bundles that include one or any combination of carbon, glass, aramid and basalt fibers, impregnated with polyamide (PA, such as Nylon 6 and Nylon 66), polypropylene (PP), polyphenylene sulfide (PPS), polybutylene terephthalate (PBT), polyetheretherketone (PEEK), polyethylene terephthalate (PET), polycarbonate, polyethylene, polystyrene, polyvinyl chloride, or any combination thereof. Fiber volume fractions range from about 40 to about 60 wt. %. The structural members may be antimicrobial, antifungal, antibacterial, or a combination thereof. The structural members may be moisture-resistant, heat-resistant, insulating, noise-absorbing, vibration-dampening, or a combination thereof. The structural member may be moisture-wicking. The structural member may be corrosion-resistant.

The structural members may include one or more outer portions. The outer portions may function to substantially form a shape of the structural members. The outer portions may form opposing surfaces of the structural members. For example, a first outer portion may form a mating surface with a subfloor (e.g., a substrate) while an opposing second outer portion may create a walking surface, a surface to support one or more items, or both. The outer portions may include one or more planar portions, one or more arcuate segments, one or more contoured portions, one or more holes, one or more notches, one or grooves, one or more fillets, one or more bumps, or a combination thereof. The outer portions of each structural member may be substantially coplanar, substantially orthogonal, or both. The outer portions may form an angle other than substantially coplanar, substantially orthogonal, or both. The outer portions may form at least a portion of an outer periphery of the structural members. The outer portions may be uniform or may vary in dimensions. The outer portions may include one or more abrasive surfaces. The outer portions may include one or more seams, one or more cutouts, or both. The outer portions of a plurality of structural members may abut one another to form the flooring system. The outer portions of a plurality of structural members of a flooring system may be substantially coplanar to create a flat surface. The outer portions may include a flange, lip, or both. The flange, lip, or both may mate to a structure of a compartment, room, or both.

The outer portions may include one or more nubs. The nubs may function to provide increased friction between one or more items, one or more users, or both and the structural members. The nubs may function to abut a structure to secure the flooring system to the structure. The structure may be a vehicle structure, building structure, another structure, or a combination thereof. The nubs may be monolithically formed with the outer portions. The nubs may be formed using an embossing process, a mechanical portion of a die during manufacturing, or both. The nubs may be positioned anywhere along the outer portions, walls of the structural member, or both. The nubs may form any desired pattern. The nubs may have any size and/or shape. The nubs may form an abrasive surface. The nubs may be uniform or may vary in size and/or shape.

The outer portions may be interconnected by one or more walls. The walls may function to at least partially form an outer periphery of the structural members. The walls may function to provide structural integrity to the structural member. The walls may extend between outer portions to form a shape of the structural member. The walls may create a desired gap between outer portions. The gap may be substantially similar to a width and/or thickness of the structural member. The walls may form a mating surface of the structural members. For example, walls of abutting structural members may abut each other to form a joint between the structural members. The walls may be joined using one or more sealants, one or more adhesives, or both. The walls may include one or more contoured surfaces, one or more arcuate portions, one or more linear segments, or a combination thereof. The walls may be substantially planar. The walls may include one or more mating features to interconnect a plurality of structural members. For example, a wall of a first structural member may include a male feature that engages a female feature of a wall of a second structural member so that the structural members are joined together. The walls may include a hole, slot, cutout, or a combination thereof. The walls may be monolithically formed with the outer portions. The walls may have a thickness substantially similar or different to the outer portions.

The structural members may include one or more ribs. The ribs may function to improve structural integrity of the structural members. The ribs may interconnect the outer portions of the structural members. The ribs may span a distance between outer portions of the structural members. The ribs may extend through a thickness of the structural member. The ribs may be monolithically formed with the structural member. The ribs may be uniform or may vary in dimensions. Each structural member may include about one rib or more, about 10 ribs or more, or about 20 ribs or more. Each structural member may include about 40 ribs or more, about 30 ribs or more, or about 25 ribs or more. The ribs may extend along a longitudinal axis of the structural member, a latitudinal axis of the structural member, or both. For example, the ribs may extend along the structural member coaxial to the longitudinal axis, parallel to the longitudinal axis, or both. The ribs may project from a surface of the structural member. For example, the ribs may project substantially orthogonal to an outer portion of the structural member. The ribs may project from a surface of the structural member at any desired angle. The ribs may project relative to a surface of the structural member at an angle of about 30 degrees or more, about 45 degrees or more, or about 60 degrees or more. The ribs may project relative to a surface of the structural member at an angle of about 120 degrees or less, about 105 degrees or less, or about 90 degrees or less. The ribs may have a thickness substantially equal to an overall thickness of the structural member. The ribs may have an increased thickness relative to the structural member, a decreased thickness relative to the structural member, or both. For example, a first set of ribs may have a thickness greater than the thickness of the structural member and a second set of ribs may have a thickness less than the thickness of the structural member. The ribs may be locally reinforced with one or more reinforcing additives during the pultrusion process, after the pultrusion process, or both. For example, the ribs may be locally reinforced with glass to increase structural integrity of the ribs.

The ribs, outer portions, walls, or a combination thereof may form one or more channels of the structural member. The channels may function to increase structural integrity of the structural member. The channels may function to provide air circulation within a compartment where the flooring system is located. The channels may be fully enclosed, partially enclosed, or both. For example, the channels may be fully enclosed by interconnected outer portions, walls, ribs, or a combination thereof except for terminal longitudinal ends of the channels that form openings of the channels. The channels may have about two walls or more, about three walls or more, or about four walls or more. The channels may have about eight walls or less, about seven walls or less, or about six walls or less. The channels may be an open channel. The channels may be any desired shape. The channels may be C-shaped, V-shaped, W-shaped, O-shaped, D-shaped, G-shaped, or a combination thereof. The channels may be rectangular, tubular, cylindrical, square, or a combination thereof. The channels may be hollow or may be solid. The channels may include one or more secondary components (e.g., an insert) housed within the channels. The channels may form a central region of the structural members. The channels may form a cavity, tunnel, or both. The channels may include one or more crossmembers. The channels may be free of crossmembers.

The channels may receive an insert. The insert may function to increase structural integrity of each channel. The insert may function to tune one or more structural characteristics of the flooring system. For example, the insert may be configured to modify one or more characteristics of the structural member, such as load capacity, strength, stiffness, elasticity, compressibility, noise-absorption, moisture-absorption, moisture-resistance, vibration-dampening, thermal insulation, or a combination thereof. The insert may be a solid component. For example, the insert may be a rod extending through the ducts to increase structural integrity. The insert may be an adhesive material, a structural foam material, or both. The structural foam material may be a structural foam material as taught in U.S. Pat. Nos. 4,017, 986; 6,668,457; 6,730,713; 7,199,165; 7,438,782; 7,473, 715; 7,892,396; 8,236,128; 8,771,564; and 9,427,902, all of which are incorporated herein for all purposes. For example, an inner surface of the cavity may include one or more expandable materials configured to expand upon activation to fill the cavity. The insert may be any size and/or shape. The insert may include a plurality of loose particles. The insert may be a liquid, foam, solid, or a combination thereof.

The structural members may include a ramp. The ramp may function to assist a user in installing the flooring system, interconnecting structural members, or both. For example, a substrate may be applied to one or more outer portions of the structural members and the ramp may ensure that the substrate does not extend beyond one or more terminal edges of the structural members so that the structural members can be properly installed in a desired structure. The ramp may be a contoured surface of the structural member. The ramp may be connected to the outer portions, walls, ribs, or a combination thereof of the structural member. The ramp may project from a surface of the structural member. The ramp may be contoured, substantially linear, or both. The ramp may be a block. The ramp may mate to a substrate of the flooring system.

The substrate may function to support the structural members. The substrate may have overall dimensions similar to the structural members. The substrate may be a lowermost surface of the flooring system (e.g., a subfloor). For example, the substrate may be positioned beneath the structural members so that the structural members are contacted by one or more objects housed within a transportation trailer. The substrate may be any material that may support the structural members, secure the structural members, or both. The substrate may be metal, a polymer, wood, or a combination thereof. The substrate may be a fibrous material, a filament mat, or a combination thereof. The structural members may be directly adhered to the substrate or may include an intermediate layer. The structural members may be directly adhered to the substrate via the insert, an additional adhesive material, or both. The structural members may be fastened to the substrate free of adhesives. For example, the structural members may be fastened to the substrate via one or more fasteners, such as screws, bolts, pins, other mechanical fasteners, or a combination thereof.

A plurality of structural members may be interconnected along one or more connecting portions. The connection portions may function to secure two or more structural members together. The connecting portions may be located along a peripheral edge of the structural members, substrate, or both. The connecting portions may be integrally formed with the structural members. The connecting portions may be any mechanical fastener configured to lock abutting structural members. For example, a first structural member may include a male portion and a second structural member may include a female portion so that the female portion receives the male portion and interconnects the first structural member and the second structural member. The connecting portions may be a hook, latch, clasp, fastener, loop, tooth, pin, or a combination thereof. The connecting portions may be a flange. The connecting portions may include one or more flexible portions, one or more structurally rigid portions, or a combination thereof. The connecting portions may include one or more adhesives to bond a plurality of flooring members together. The connecting portions may be free of one or more adhesives, one or more mechanical fasteners, or both. The connecting portions may be free of any secondary fasteners. A secondary fastener may be any fastener not monolithically formed with one or more of the structural members. The connecting portion may form a joint.

The connecting portion may be formed with one or more projections of the structural members. The projections may function to interconnect structural members. The projections may at least partially support one or more connected structural members. The projections may extend from an outer portion, rib, wall, or a combination thereof of a structural member. The projections may be an desired size and/or shape. The projections may extend at any angle relative to the structural member. The projections may be monolithically formed with the structural member. The projections may be flexible. The projections may be rigid. The projections may be locally reinforced to increase structural integrity. The projections may be substantially linear, may include one or more bends, or both. The projections may include a mechanical fastener. The mechanical fastener may be a hook, latch, finger, tooth, or a combination thereof. Projections of multiple structural members may interconnect to form the connecting portion. A connecting portion may include any number of projections. As such, it is contemplated that the structural members may include any desired number of projections.

The connecting portion may form one or more notches in the flooring system. The notches may function to facilitate connection of two or more structural members. The notches may be formed by abutting structural members. For example, each structural member may include one or more filleted and/or notched edges that abut one another to form the notch. The notch may be continuous along one or more sides of the structural members. The notch may be in any position along the structural members. The notch may be any shape. The notch may be recessed from a surface of the structural members. For example, the notches may be recessed from an outer surface of an outer portion. The notches may be filled so that the filling is substantially coplanar with an outer surface of the flooring system.

The notch may be filled with a sealant. The sealant may function to connect two or more structural members. The sealant may seal one or more gaps between structural members, between structural members and a substrate, between the flooring system and an outside structure, or a combination thereof. The sealant may be an adhesive. The sealant may be moisture-resistant, puncture-resistant, or both. The sealant may be any desired sealant material to facilitate protection of the flooring system, sealing of the flooring system, or both. The sealant may require one or more curing agents or may be free of curing agents. The sealant may be thermoactivated. The sealant may cure at room temperature. The sealant may be tacky. The sealant may be try to the touch. The sealant may form a bond between any desired materials.

Turning now to the figures, FIG. 1 illustrates a top perspective view of a flooring system 10. The flooring system 10 includes a plurality of interconnected structural members 12. As illustrated, the structural members 12 are interconnected along connecting portions 20 (see FIGS. 2A-2D).

FIG. 2A illustrates cross-section 2-2 of the flooring system 10 of FIG. 1. The flooring system 10 includes a plurality of interconnected structural members 12. Each structural member 12 includes opposing outer portions 14. A plurality of ribs 16 extend between the opposing outer portions 14 of each structural member 12 to form a plurality of channels 22 that extend along a length of the structural members 12 (see FIG. 1). The structural members 12 are joined along a connecting portion 20. The structural members 12 may include one or more projections 18 that project from one or more walls, one or more ribs 16, or both of the structural members 12. The projections 18 of one structural member 12 may be configured to support a portion of an abutting second structural member 12. It should be noted that the projections 18 may be an extension of an outer portion 14 of the structural member.

FIG. 2B illustrates an additional cross-section 2-2 of the flooring system 10 of FIG. 1. The flooring system 10 includes a plurality of interconnected structural members 12. Each structural member 12 includes opposing outer portions 14. A plurality of ribs 16 extend between the opposing outer portions 14 of each structural member 12 to form a plurality of channels 22 that extend along a length of the structural members 12 (see FIG. 1). The structural members 12 are joined along a connecting portion 20. The structural members 12 may include one or more projections 18 that project from one or more walls 26, one or more ribs 16, or both of the structural members 12. The projections 18 of one structural member 12 may be configured to support a portion of an abutting second structural member 12. It should be noted that the projections 18 may be an extension of an outer portion 14 of the structural member. As illustrated, the walls 26 of connected structural members 12 may abut one another in the connecting portion 20. Additionally, a sealant 28 may be disposed between the walls 26, the projections 18, or both to form a joint between the structural members 12.

FIG. 2C illustrates an additional cross-section 2-2 of the flooring system 10 of FIG. 1. The flooring system 10 includes a plurality of interconnected structural members 12. Each structural member 12 includes opposing outer portions 14. One or more of the outer portions 14 may include a plurality of nubs 30. A plurality of ribs 16 extend between the opposing outer portions 14 of each structural member 12 to form a plurality of channels 22 that extend along a length of the structural members 12 (see FIG. 1). The structural members 12 are joined along a connecting portion 20. The structural members 12 may include one or more projections 18 that project from one or more walls 26, one or more ribs 16, or both of the structural members 12. The projections 18 of one structural member 12 may be configured to support a portion of an abutting second structural member 12. It should be noted that the projections 18 may be an extension of an outer portion 14 of the structural member. As illustrated, the walls 26 of connected structural members 12 may abut one another in the connecting portion 20. Additionally, a sealant 28 may be disposed between the walls 26, the projections 18, or both to form a joint between the structural members 12.

Figure 2D:
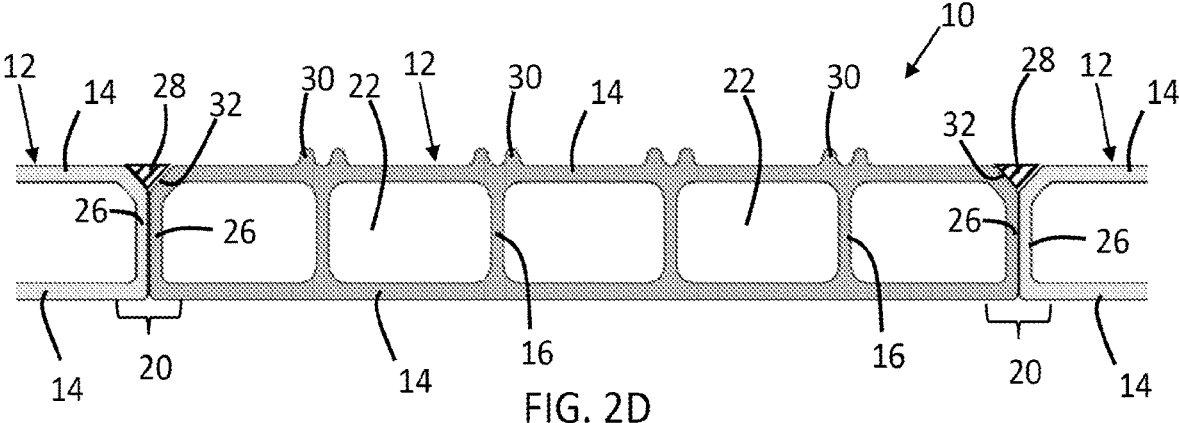
FIG. 2D is an illustrative cross-sectional view 2-2 of FIG. 1.

FIG. 2D illustrates an additional cross-section 2-2 of the flooring system 10 of FIG. 1. The flooring system 10 includes a plurality of interconnected structural members 12. Each structural member 12 includes opposing outer portions 14. One or more of the outer portions 14 may include a plurality of nubs 30. A plurality of ribs 16 extend between the opposing outer portions 14 of each structural member 12 to form a plurality of channels 22 that extend along a length of the structural members 12 (see FIG. 1). The structural members 12 are joined along a connecting portion 20. As illustrated, the walls 26 of connected structural members 12 may abut one another in the connecting portion 20 to form a notch 32. A sealant 28 may be disposed between the walls 26, within the notch 32, or both to form a joint between the structural members 12.

Figure 3:
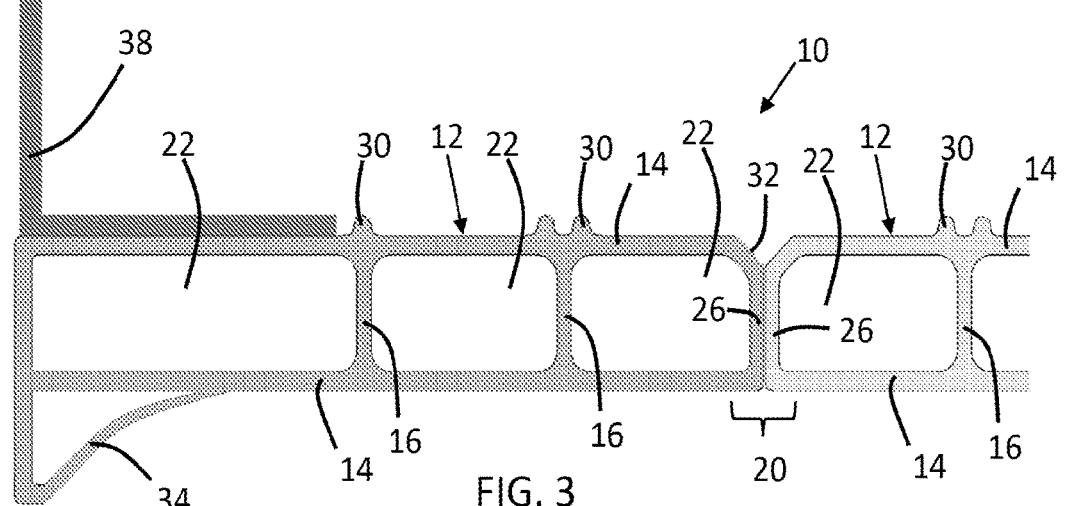
FIG. 3 is a cross-sectional view of a flooring system.

FIG. 3 illustrates a cross-section of a flooring system 10. The flooring system 10 includes a plurality of interconnected structural members 12. Each structural member 12 includes opposing outer portions 14. One or more of the outer portions 14 may include a plurality of nubs 30. The nubs 30 may be configured to abut a portion of a vehicle structure 38 (e.g., a vehicle cargo box wall, a vehicle panel, etc.) or may free of contact with the vehicle structure 38. As shown, the vehicle structure 38 may be disposed on a surface of an outer portion 14 of the flooring system 10. However, it is contemplated that the vehicle structure 38 may interact with the flooring system 10 in any desired manner. A plurality of ribs 16 extend between the opposing outer portions 14 of each structural member 12 to form a plurality of channels 22 that extend along a length of the structural members 12 (see FIG. 1). The structural members 12 are joined along a connecting portion 20. As illustrated, the walls 26 of connected structural members 12 may abut one another in the connecting portion 20 to form a notch 32. A sealant may be disposed between the walls 26, within the notch 32, or both to form a joint between the structural members 12 (see FIG. 2D). Furthermore, an outer portion 14 of one or more of the structural members 12 may include a ramp 34 forming a substantially contoured surface.

Figure 4:
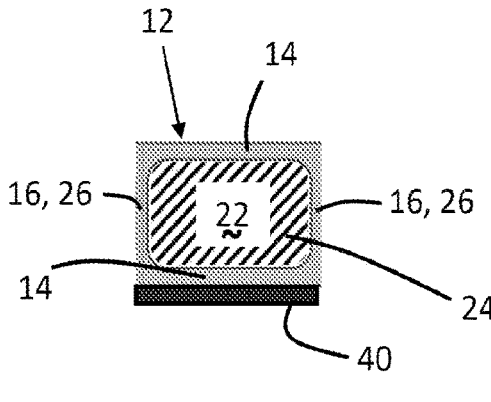
FIG. 4 illustrates a cross-sectional view of a channel of a structural member.

FIG. 4 illustrates a cross-sectional view of a channel 22 of a structural member 12. The channel 22 is formed by opposing outer portions 14 of the structural member 12 interconnected by one or more ribs 16, one or more walls 26, or both (see FIGS. 2A-2D). As shown, the channels may be at least partially filled with an insert 24. The insert 24 may at least partially or entirely fill the channel 22. While only one channel 22 of a structural member 12 is illustrated, it is contemplated that a plurality of channels 22 may include an insert 24. Additionally, the structural member 12 (and thus the flooring system) may be disposed along a substrate 40. The substrate 40 may abut an outer portion 14 of the structural member 12. An adhesive, sealant, or both may be disposed between the substrate 40 and the structural member 12.

Figures 5, 6:
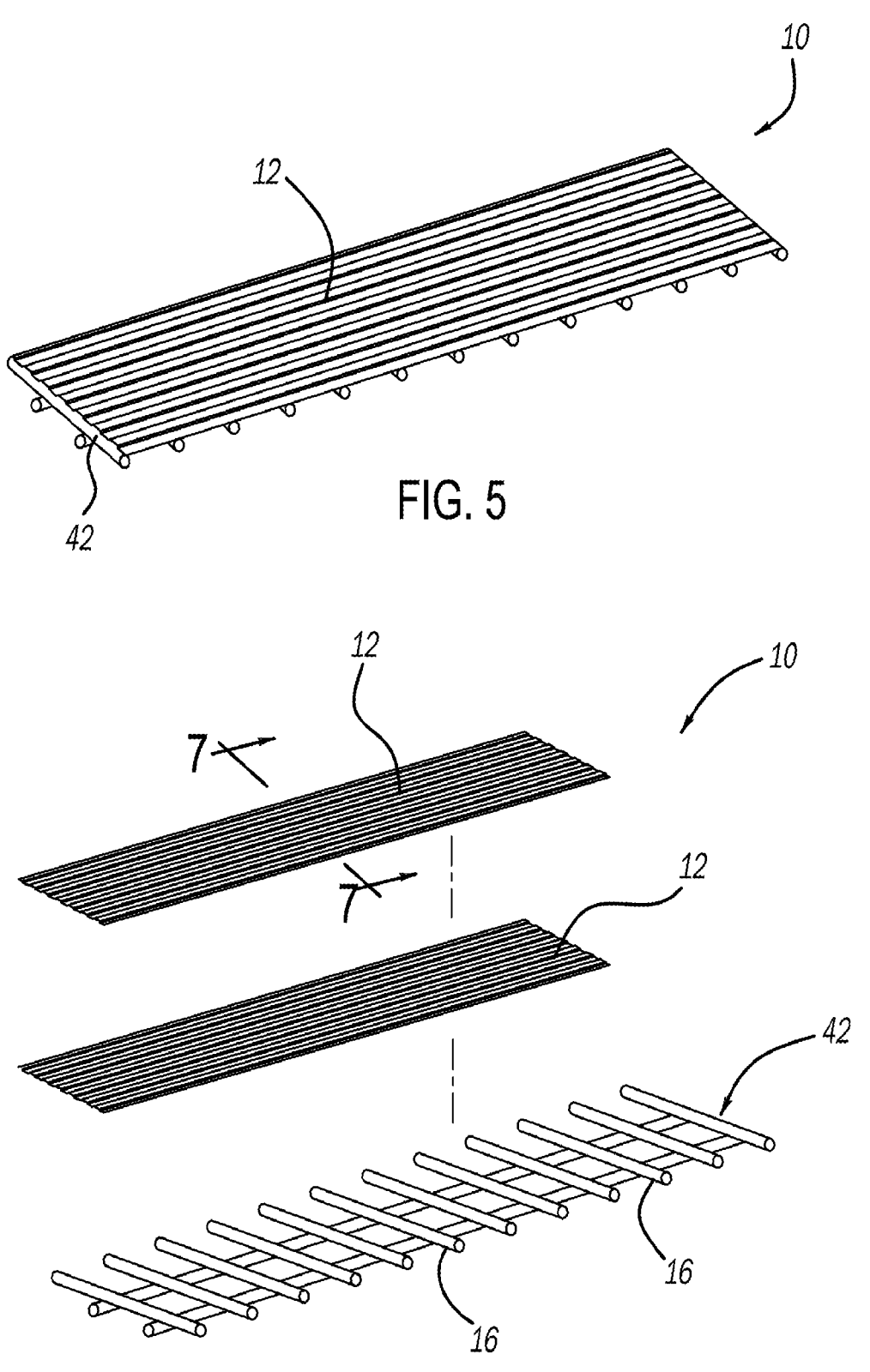
FIG. 5 is a perspective view of a flooring system in accordance with the present teachings.
FIG. 6 is an exploded view of the flooring system of FIG. 5.

FIG. 5 is a perspective view of a flooring system 10 in accordance with the present teaching. The flooring system may include a structural member 12 disposed along a chassis 42. The structural member 12 may be secured to the chassis 42 using a variety of techniques. However, it is contemplated that the structural member 12 may be secured to the chassis 42 using an adhesive, fasteners, or a combination thereof. The structural member 12 may provide a floor surface for an operator to walk across. The structural member 12 may also make contact with one or more items stored or being supported by the flooring system 10. The structural member 12 may be substantially planar or may include an undulating surface (see FIG. 7). The structural member 12 may further strengthen the chassis 42 and may provide a surface substantially free of openings and/or holes. For example, the chassis 42 may provide a base support for the flooring system 10 while the structural member 12 may reinforce the chassis 42 and act as a support for the flooring system 10. It is contemplated that the addition of the structural member 12 in accordance with the present teachings may provide increase load strength of the flooring system 10, improved displacement (e.g., the flooring system 10 may have increase flex or stiffness without fracture), or both.

It is envisioned that all or a portion of the flooring system 10 may be pultruded or may be forming using a continuation manufacturing method. For example, the chassis 42 may include a plurality of interconnected ribs (see FIG. 6) assembled together while the structural member 12 may be continuously manufactured and disposed over the chassis 42. The structural member 12 may be cut or otherwise shaped to desired dimensions to meet requirements of a given application.

FIG. 6 illustrates an exploded view of the flooring system 10 of FIG. 5. The flooring system 10 includes a chassis 42. The chassis 42 is formed using a plurality of interconnected ribs 16. The ribs 16 may extend transversely or longitudinally along a length of the chassis 42. It is envisioned that the ribs 16 may form a subfloor or frame to support one or more structural members 12. The ribs 16 may be secured to one another using fasteners, adhesives, or both. Alternatively, the ribs 16 may be free of fasteners, adhesives, or both. For example, the ribs 16 may each include mating notches or slots so that the ribs 16 may be interconnected along the notches or slots to form an overall shape of the chassis 42. As illustrated, a plurality of structural members 12 may be disposed along at least one surface of the chassis 42. It should be noted that the structural members 12 may also be disposed along more than one surface, such as opposing surfaces of the chassis 42. The structural members 12 may abut one another to further increase structural integrity of the flooring system 10. The structural members 12 may have substantially similar dimensions so that the structural members 12 rest substantially flush to one another free of any voids of gaps between the structural members 12. Alternatively, the structural members 12 may include one or spacers or nubs (see, e.g., FIG. 3) to ensure a desired gap between the structural members 12. The gap may provide a means of draining moisture or debris between the structural members 12 to ensure unwanted displacement or damage to the structural members 12 does not occur due.

Figure 7:
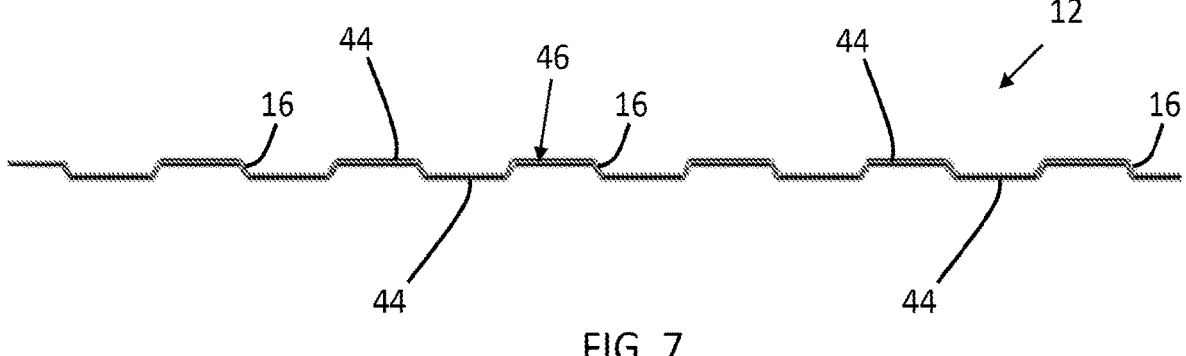
FIG. 7 is cross-section 7-7 of the structural member of FIG. 6.

FIG. 7 illustrates cross-section 7-7 of the structural member 12 of FIG. 6. The structural member 12 may be continuously formed so that the structural member 12 is substantially free of seams or connecting portions. However, it is also envisioned that the structural member 12 may be secured to additional structural members 12 to form the overall flooring system (see FIG. 1). The structural member 12 may include an undulating surface 46 formed by a plurality of ribs 16 interconnected by a plurality of supports 44. A surface of the supports 44 may form a contact surface for one or more items, operators, or both using the flooring system. It should be noted that the shape and dimensions of the ribs 16, the supports 44, or both may be any desired specification. The undulating surface 46 formed from the ribs 16 and the supports 44 may provide increased structural integrity to the flooring system. Additionally, the undulating surface 46 may also provide increased friction between items or users of the flooring system when compared to a conventional planar flooring system. It is also contemplated that the undulating surface 46 may provide a connecting means with additional structural members 12. For example, as shown in FIG. 6, the undulating surfaces 46 of the structural members 12 may mate with one another to substantially decrease axial or lateral movement of the structural members 12 relative to each other.

Illustrative Example

Table 1 below illustrates test results comparing a conventional flooring system to the flooring system described herein. Stress and strain testing were applied to both the conventional flooring system and the flooring system describe herein.

TABLE 1

| | | Comparative Test Results | | | |
|---|---|---|---|---|---|
| Construction | Load Floor Weight (Kg) | Load applied (KN) | Displacement (mm) | Max Stress (MPa) | Floor Stress (MPa) |
| HSLA 340 Steel (Baseline CAD) | 210 | 154 | 7.85 | 301 | 177.2 |
| Composite (3.5 mm Thick), 3 piece Flooring System | 131 | 154 | 10.6 | 425.8 | 68.2 |
| % change vs Baseline | −37.6% | NA | +33.7% | +41.4% | +67.1% |
| Optimized Composite (3 mm Thick), 2 piece Flooring System | 164 | 154 | 9 | 360.2 | 66.3 |
| % change vs Baseline | −50.4% | NA | +14.6% | +16.3% | −62.5% |

As shown in Table 1 above, a conventional flooring system made from HSLA 340. Steel was compared to two flooring systems as described herein. The first sample was a 3-piece flooring system (see FIG. 6) having a pair of structural members disposed along a chassis. The second sample was a 2-piece flooring system having a chassis and a structural member. Based on test results, the composite systems performed better in various categories when a 154 KN force was applied. Both the 3-piece and 2-piece composite systems improved an overall max stress of the flooring system while also decreasing an overall weight by at least about 37.6% (about 50.4% for the 2-piece design). Additionally, the composite flooring also improved displacement of the flooring during testing to allow for further flexing without fracture. Thus, it is envisioned that a 2-piece or 3-piece design may provide an optimized alternative to a conventional steel flooring system to decrease weight and improve overall structural integrity.

The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps. The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The disclosures of all articles and references, including patent applications and publications, are incorporated by reference for all purposes. Other combinations are also possible as will be gleaned from the following claims, which are also hereby incorporated by reference into this written description.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of within a range of 100+/−15.

ELEMENT LIST

10 Flooring System
12 Structural Member
14 Outer Portion
16 Rib
18 Projection
20 Connecting Portion
22 Channel
24 Insert
26 Wall
28 Sealant
30 Nub
32 Notch
34 Ramp
38 Vehicle Structure
40 Substrate
42 Frame
44 Support
46 Undulating Surface

What is claimed is:

1. A flooring system comprising:
a plurality of structural members, each of the structural members having opposing outer portions with one or more outer walls and one or more ribs extending between the opposing outer portions;
wherein the opposing outer portions, the one or more outer walls, and the one or more ribs form a plurality of channels within the structural members along a length of each structural member;
wherein outer walls of adjacent structural members abut each other at a connecting portion;
wherein the one or more outer walls, the opposing outer portions, or both include a filleted and/or notched edge to form a notch,
wherein the notch is recessed from an outer surface of one of the opposing outer portions, an outer walls of the one or more outer walls, or both, such that the notch in a structural member mirrors the notch of an adjacent structural member about the connecting portion;
wherein when the adjacent structural members are joined at the connecting portion, adjacent notches that are filled with an adhesive, sealant, or both, to connect the structural members;
wherein the one or more outer walls are substantially free of one or more projections extending from a central portion of a length of the one or more outer walls; and
wherein each structural member is an integrally formed pultruded material.

2. The flooring system of claim 1, wherein at least one of the plurality of structural members includes one or more projections that extends generally perpendicularly to the one or more outer walls, wherein the one or more projections rest along one of the outer portions of the adjacent structural member to form a joint at abutting structural members.

3. The flooring system of claim 1, wherein the flooring system includes a substrate and the plurality of structural members are disposed along a surface of the substrate.

4. The flooring system of claim 1, wherein the integrally formed pultruded material is a polyurethane material.

5. The flooring system of claim 4, wherein the integrally formed pultruded material includes a base material and one or more reinforcing additives.

6. The flooring system of claim 1, wherein the plurality of channels are parallel and have a uniform height and a uniform width.

7. The flooring system of claim 6, wherein at least a portion of the plurality of channels is filled with an insert.

8. The flooring system of claim 7, wherein the insert is a structural foam reinforcing material, sealant material, or both.

9. The flooring system of claim 1, wherein the flooring system is corrosion resistant, moisture resistant, antimicrobial, antifungal, antibacterial, or a combination thereof.

10. The flooring system of claim 1, wherein the flooring system is a transportation trailer floor.

11. The flooring system of claim 10, wherein the flooring system is thermally insulated.

12. The flooring system of claim 1, wherein at least one of the opposing outer portions includes a plurality of nubs disposed along the outer surface.

13. The flooring system of claim 1, wherein at least one of the outer portions includes a contoured ramp.

14. The flooring system of claim 1, wherein the opposing outer portions of the plurality of structural members are generally parallel.

15. The flooring system of claim 3, wherein the plurality of structural members are directly adhered to or directly fastened to the substrate.

16. The flooring system of claim 1, wherein a channel of the plurality of channels is maintained about the connecting portion.

17. A flooring system comprising:
a plurality of structural members, each of the structural members having opposing outer portions with one or more outer walls and one or more ribs extending between the opposing outer portions;
wherein the opposing outer portions, the one or more outer walls, and the one or more ribs form a plurality of channels within the plurality of structural members along a length of each structural member;
wherein a first projection projects from at least one of the one or more outer walls in a generally parallel direction to the opposing outer portions and in line with one of the opposing outer portions;
wherein a second projection projects from at least one of the outer walls in a generally parallel direction to the opposing outer portions;
wherein the second projection forms a recess for receiving the first projection; and
wherein adjacent structural members are joined along a connecting portion such that the first projection is positioned within the recess and is in planar contact with the second projection of an adjacent structural member to create a generally continuous surface of at least one of the opposing outer portions between the structural members.

US 12,668,315 B2

17

18

18. The flooring system of claim 17, wherein each channel of the plurality of channels is fully enclosed except for terminal ends of the each channel along a longitudinal axis of the each channel.

19. The flooring system of claim 17, wherein each structural member is an integrally formed pultruded material.

20. A flooring system comprising:

a plurality of structural members, each of the structural members having opposing outer portions with one or more outer walls and one or more ribs extending between the opposing outer portions;

wherein the opposing outer portions, the one or more outer walls, and the one or more ribs form a plurality of channels within the plurality of structural members along a length of each structural member;

wherein a first projection projects from at least one of the one or more outer walls in a generally parallel direction to the opposing outer portions and is in line with one of the opposing outer portions;

wherein a recess is formed in a peripheral edge of the outer portion of an adjacent structural member opposite to the structural member having the outer wall from which the first projection projects;

wherein two of the structural members are joined along a connecting portion such that the first projection is received within the recess in the outer portion of the adjacent structural member to create a generally continuous surface of at least one of the opposing outer portions between the structural members; and wherein the outer walls of adjacent structural members abut each other at the connecting portion.

\* \* \* \* \*